United States Patent Office 2,980,732
Patented Apr. 18, 1961

2,980,732
PRODUCTION OF TRICHLOROBENZOIC ACID

Theodore A. Girard, Wayne Township, Eugene P. Di Bella, Garfield, and Henri Sidi, Rutherford, N.J., assignors to Heyden Newport Chemical Corporation, a corporation of Delaware No Drawing. Filed Oct. 15, 1956, Ser. No. 615,778

10 Claims. (Cl. 260—523)

The present invention relates to the production of trichlorobenzoic acids.

This application is a continuation-in-part of our copending application Serial No. 463,824, filed October 21, 1954.

According to the present invention, 2,3,6-trichlorobenzoic acid, as well as various isomers of this acid or mixtures of such isomers, can be produced in high yield from the corresponding trichlorobenzyl halides by esterifying the latter, as for example, with an alkali metal salt of an aliphatic acid, to form the corresponding benzyl ester and then oxidizing the benzyl ester to the trichlorobenzoic acid. Yields of acid as high as about 87% based on the trichlorobenzyl chloride charged can be obtained by this route, whereas routes involving conversion of this halide to some other intermediate followed by oxidation of that intermediate to the acid, produce much lower yields.

We prepare the trichlorbenzyl halide preferably by chlorinating toluene or o-chlorotoluene, according to a process described hereinafter, which yields a mixture of isomers having a high content of the 2,3,6-isomer. Our process by which we obtain the acid in high yield from the halide has the further advantage of preserving this high content of the 2,3,6 isomer so that the resulting tricolorbenzoic acid product consists, in large part, of 2,3,6-trichlorobenzoic acid. This is the isomer of principal individual value according to present information. Thus, our process in one view may be regarded as a process for the production of this isomer since the latter amounts to about 50%, and preferably more, of the mixture of isomers produced.

In another view, our process may be regarded as one for the production of the new and valuable empirical product, considered in greater detail hereinafter, consisting predominantly, in a quantitative sense, of a mixture of trichlorobenzoic acid isomers with the 2,3,6 isomer forming a major amount of the mixed isomers and preferably ranging from 60% upwardly.

The course of our reaction for converting the halide to the acid may be represented as follows:

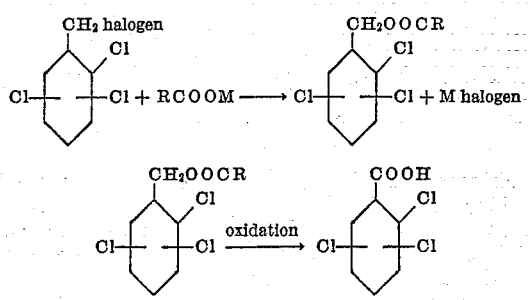

where halogen=Cl or Br; R=H or an alkyl radical containing 1 to 4 carbon atoms (although other esterifying agents may be used, see Examples VIII to XII); and M=Na or K; and where one chlorine is in the "2" position and the other two chlorine atoms may occupy various other positions.

The chlorination of o-chlorotoluene and of toluene to trichlorotoluene may be represented as follows:

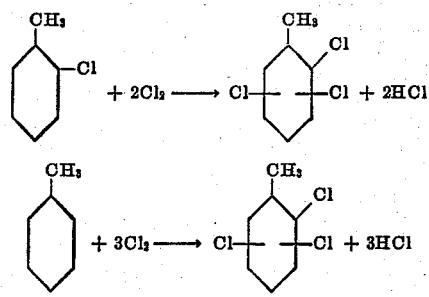

While we prefer to chlorinate o-chlorotoluene or toluene to produce trichlorotoluene as pointed out above, we can chlorinate m-chlorotoluene or various dichlorotoluenes or mixtures of these products either with each other or with toluene or o-chlorotoluene in order to produce trichlorotoluene. For example, the products comprising the fore run of the distillation step whereby trichlorinated products of the present invention are usually obtained from the reaction mixtures may, if desired, be recycled, fresh starting material being added, such for instance as toluene, so that a mixture of toluene and dichlorotoluenes together with some monochlorinated products would be further chlorinated. Such a process would, of course, provide a higher proportion of trichlorinated products on the basis of the material charged.

The trichlorotoluene can be readily halogenated with either chlorine or bromine to the corresponding benzyl halide in accordance with the following illustrative reaction utilizing the mixed isomers from the dichloroination of o-chlorotoluene without appreciably changing the positions of the chlorine atoms on the ring:

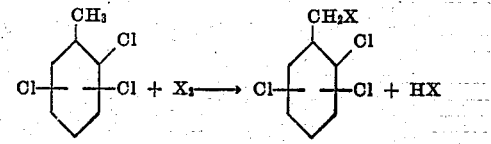

X=Br or Cl

When o-chlorotoluene, m-chlorotoluene, toluene, the aforementioned fore run products, or mixtures thereof, are chlorinated to trichlorotoluene in the presence of a catalyst, for example, aluminum chloride, antimony chloride, boron trifluoride, iron, iodine, stannic chloride, zirconium chloride, or mixtures thereof, the yield of trichlorotoluene as well as the amount of 2,3,6-trichlorotoluene present in the trichlorotoluene fraction depends on a number of factors including the catalyst used. In general, the conversion of trichlorotoluene will be in the range of 35-80% of the starting material and the trichlorotoluene fraction will contain about 50-75% 2,3,6-tricolortoluene and 35-15% 2,4,5 together with other isomers. In the chlorination step, catalysts other than iodine or stannic chloride are preferred as these other catalysts produce the higher conversion (about 70-80% of trichlorotoluene when o-chlorotoluene is the starting material), and the trichlorotoluene fractions so produced contain about 60-75% of 2,3,6-trichlorotoluene and about 30-15% of 2,4,5-trichloro toluene, together with other isomers. These fractions are preferred as the trichlorobenzoic acid produced therefrom is an excellent herbicide. Converting to the trichlorobenzoic acid by the present process does not substantially change the relative amounts of the isomers.

EXAMPLE I

This series of runs illustrates the preparation of trichlorotoluene by the dichlorination of o-chlorotoluene and except for the variations noted in Table 1, the runs were conducted under the same conditions. The general procedure was to place in a 1 liter, 3-necked flask equipped with stirrer, thermometer and gas inlet attachment, 500 g. (3.95 moles) of o-chlorotoluene and the quantity of catalyst shown in Table 1. Chlorine gas was then passed over the rapidly stirred mixture at a constant rate (orifice No. 2, setting 30, on a Pyrex brand manometric flowmeter). The temperature of the reaction mixture was controlled by an ice bath (for the 15°–20° reactions) or a Dry Ice-methanol bath (for the −5° to 0° C. reactions). When the increase in weight of the flask contents reached 270–280 g. (approximately 8 gram atoms of chlorine) the reaction was discontinued. The mixture was then stirred with about 300 ml. of hot water (45–50° C.) for 5 minutes. The resulting organic layer was then washed four times with equal volumes of hot water (45–50° C.) and submitted to fractional distillation through a column equivalent to 5 theoretical plates. A reflux ratio of 4:1 was used during the separation of the forerun (dichlorotoluene) and a reflux ratio of 1:1 during the separation of the trichlorotoluene (product) fraction. The still pot residue consisted mainly of tetrachlorotoluenes which were not purified. Trichlorotoluene fractions boiling at 111°–117° C. (20 mm.) were collected and analyzed to determine the percent of 2,3,6-isomer in the mixed trichlorotoluene isomer product.

The results and any pertinent modifications of this general procedure are listed in Table 1.

Table 1

| Run No. | Catalyst | Temp., °C. | Distillation Data | | |
|---|---|---|---|---|---|
| | | | Product, Wgt. g. | Percent Conversion to Product | Percent 2,3,6 Isomer |
| A | 19.75 g. of aluminum chloride | 15 to 20 | Product—532 | 69.0 | 71.92 |
| B | 50 g. of aluminum chloride | −5 to 0 | Product—538.8 | 69.8 | 67.6 |
| C | 20 g. of aluminum chloride with boron trifluoride | 15 to 20 | Product—583 | 75.6 | 68.97 |
| D | 5.0 g. of iron filings | 15 to 20 | Product—540.7 | 70.1 | 71.75 |
| E | 4 g. of iodine | 15 to 20 | Product—268 | 34.8 | 53.71 |
| F | 50 g. of ferric chloride | −5 to 0 | Product—600.1 | 77.8 | 67.7 |
| G | 50 g. of antimony chloride | 10 to 15 | Product—596.1 | 77.0 | 71.6 |
| H | 50 g. of ferric chloride | −5 to 0 | Product—559.5 | 72.2 | 68.7 |
| I | 19.75 g. of stannic chloride | 15 to 20 | Product—233 | 29.8 | 68.6 |
| J | 19.75 of zirconium chloride | 15 to 20 | Product—536 | 74.8 | 67.6 |

In run C boron trifluoride was trickled through the reaction mixture during the chlorination. For runs F and H carbon tetrachloride was employed as a solvent (700 ml.). The "percent conversion to product" is percent of o-chlorotoluene recovered as trichlorotoluene (product). The "percent 2,3,6-isomer" is the percent, by weight, of 2,3,6-trichlorotoluene present in the mixed isomers of trichlorotoluene.

The dichlorotoluene fraction (forerun) can be monochlorinated in the ring in the same manner as the o-chlorotoluene was dichlorinated to form an additional quantity of trichlorotoluene containing the 2,3,6-isomer. In this manner it is possible to increase the yield, for example, to about 90% based on the amount of o-chlorotoluene originally charged to the reaction.

EXAMPLE II

This example illustrates the trichlorination of toluene to trichlorotoluene. Three hundred and sixty-four grams (3.95 moles) of toluene was mixed with 20 g. of aluminum chloride and this mixture was chlorinated with efficient stirring at a temperature of 15°–20° C. The reaction was discontinued when the increase in weight of the reaction mixture reached 410 g. (11.8 g. atoms of chlorine).

The mixture was stirred with an equal volume of hot water for five minutes and the resulting organic layer was washed three times with equal volumes of hot water. The resulting crude product (761.8 g.) was then fractionated through a column equivalent to 5 theoretical plates. 2nd fraction (trichlorotoluene) 112°–122° C. (20 mm.) 463 g. (60% yield).

*Analysis.*—Calculated for $C_7H_5Cl_3$=Cl: 54.47. Found: Cl: 54.75.

The second fraction from this distillation was found to consist of the following percentages of trichlorotoluene isomers:

| | Percent |
|---|---|
| 2,3,6-trichlorotoluene | 60.00 |
| 2,4,5-trichlorotoluene | 29.00 |
| Other isomers (chiefly 2,3,4) | 9.00 |

EXAMPLE III

This series of runs illustrates the side-chain chlorination of trichlorotoluene to trichlorobenzyl chloride. The trichlorotoluene used was prepared from o-chlorotoluene, as described in Example 1. In each experiment, gaseous chlorine was passed over the surface of the trichlorotoluene at about 205°–210° C. until the weight increase corresponded to the calculated value. The crude product was subsequently blown with air at 100° C. to remove any free chlorine and hydrogen chloride present. The results are set forth in Table II.

Table II

| Run No. | Grams of Trichlorotoluene Charged | Grams of Chlorine Charged | Time, Hours | Weight Increase (grams) | |
|---|---|---|---|---|---|
| | | | | Calc. | Actual |
| A | 500 | | 3.75 | 88 | 97.9 |
| B | 505 | 288 | 3.25 | 94 | 97.0 |
| C | 500 | 260 | 2.5 | 88 | 95.5 |
| D | 500 | 399 | 3.0 | 88 | 96.2 |
| E | 2,144.2 | 1,600 | 11.0 | 375.8 | 395.8 |

Halogenation of the side chain does not change the position of the chlorine atoms on the ring. In the runs set forth in Table II, the trichlorotoluene contained about 70% of 2,3,6-trichlorotoluene so that the trichlorobenzyl chloride also contained about 70% of 2,3,6-trichlorobenzyl chloride.

The following examples illustrate the conversion of trichlorobenzyl chloride to trichlorobenzoic acid by esterification followed by oxidation.

EXAMPLE IV

Trichlorobenzyl chloride prepared in accordance with Example III from a mixture of trichlorotoluene isomers prepared as described in Example I was converted to a reaction mixture containing trichlorobenzyl formate by reaction with sodium formate. The reaction mixture was then oxidized to trichlorobenzoic acid in a yield of 87.6% based on the amount of trichlorobenzyl chloride charged. A mixture of 774.4 grams of trichlorobenzyl chloride and 459.0 grams of sodium formate was dissolved in an acid solvent (2323 grams glacial acetic acid) and was heated at reflux temperature for eight hours. The reaction liquor was subjected to distillation under reduced pressure to remove the acetic acid. The crude concentrate was washed with 1685 ml. of water to remove impurities. The bottom or water insoluble layer was separated for subsequent oxidation.

The above conditions are illustrative and not restrictive. Any reasonable quantity of sodium formate in excess of 1 mole per mole of trichlorobenzyl chloride may be used. Potassium formate can be used in place of sodium formate. The reflux time can be varied and only needs to be long enough to effect esterification. The amount of wash water can be varied since it is used to remove sodium chloride and excess sodium formate.

The oxidation of the trichlorobenzyl ester to the acid is illustrated by an example of the oxidation of trichlorobenzyl formate. In this example, the trichlorobenzyl formate prepared above was mixed with 3640 grams of 70% nitric acid and heated at reflux temperature for 8 hours to oxidize the formate to the acid. The reaction mixture was cooled to 15° C. and the crude trichlorobenzoic acid was separated by filtration. The separated acid was washed with water and dried in a vacuum oven at 50°–55° C. The product weighed 662 grams which constituted a yield of 87.6% based on the amount of trichlorobenzyl chloride charged.

The above conditions for oxidizing the trichlorobenzyl ester are not critical. Nitric acid is a preferred oxidizing agent as its use results in a higher percentage of conversion which in turn assures a product containing about the same high percentage of 2,3,6-isomer as the starting material. However, other known oxidizing agents, for example $NO_2$, chlorine, or potassium permanganate may be used. Less nitric acid may be used, for example, 6 moles rather than the 12 moles used. A much larger amount could be used. The reflux period may be lengthened or shortened and the reagents can be combined either by adding the acid to the ester or vice versa.

In this example the trichlorobenzyl chloride had substantially the following analysis:

| | Percent |
|---|---|
| 2,3,6-trichlorobenzyl chloride | 72.00 |
| 2,4,5-trichlorobenzyl chloride | 19.00 |
| Others (chiefly 2,3,4) | 8.00 |

The trichlorobenzoic acid product had the following analysis:

| | Percent |
|---|---|
| 2,3,6-trichlorobenzoic acid | 69.00 |
| 2,4,5-trichlorobenzoic acid | 22.00 |
| Others (chiefly 2,3,4) | 9.00 |

EXAMPLE V

A mixture of 0.2 mole of trichlorobenzyl chloride, 0.765 mole of potassium acetate, and 240 ml. of glacial acetic acid was refluxed for 8 hours. The charge was cooled, poured into 500 ml. of water, and extracted with three 100 ml. portions of benzene. The benzene was removed by distillation under partial vacuum. The residue, crude trichlorobenzyl acetate, was oxidized to trichlorobenzoic acid with 2.4 moles of 70% nitric acid at reflux temperature for 8 hours. At the end of the oxidation period, the charge was poured into 500 ml. of water, and extracted with 350 ml. of benzene. The benzene extract was washed with two 50 ml. portions of water, and then extracted with one 200 ml. and one 50 ml. portion of 5% sodium hydroxide. The alkaline extract was poured into 50 ml. of 36% hydrochloric acid, cooled to 15° C., filtered, and dried at 45° C. in a vacuum oven. An 80.1% yield of trichlorobenzoic acid based on the trichlorobenzyl chloride charged was obtained.

EXAMPLE VI

These two runs were conducted in substantially the same manner as described in Example V except that esterification was produced with 0.236 gram mole of sodium acetate $.3H_2O$ per 0.2 gram mole of trichlorobenzyl chloride. The time was 8 hours. As shown in Table III, one run was made with solvent and one run was made without solvent. The yield of trichlorobenzoic acid set forth is based on the trichlorobenzyl chloride charged.

Table III

| Run No. | Solvent | Yield, Percent | Analysis Acid No. | Analysis M.P. |
|---|---|---|---|---|
| A | 115 ml. glacial acetic acid | 75.6 | 247.5 | 93–108.8 |
| B | None | 32.8 | 248.0 | 95–106.8 |

EXAMPLE VII

Each of these runs involve the production of trichlorobenzyl formate from trichlorobenzyl chloride and oxidation of the formate to trichlorobenzoic acid. In each run, esterification was conducted by heating 0.2 gram mole of trichlorobenzyl chloride (mixed isomers containing about 70% of the 2,3,6-isomer) with 0.4 gram mole of sodium formate at reflux temperature for 8 hours in the presence of and also the absence of a solvent as indicated in Table IV. Oxidation was carried out by heating the crude ester with 2 to 4 gram moles of 70% nitric acid and the trichlorobenzoic acid was recovered as described in Example V. The yields in Table IV are based on the amount of trichlorobenzyl chloride charged.

Table IV

| Run No. | Solvent | Yield, Percent | Analysis Acid No. | Analysis M.P., °C. |
|---|---|---|---|---|
| A | 115 grams glacial acetic acid | 75.5 | 246.6 | 95.2–120 |
| B | None | 18.9 | 247.3 | 100–121 |
| C | 138 g. 90% formic acid | 48.2 | 244.2 | 94.5–103.5 |

The preferred solvent is glacial acetic acid and the use of a solvent is desirable to increase the yield.

EXAMPLE VIII

The bromination of trichlorotoluene (56 g.) with 453 g. of bromine at 175° in the presence of ultraviolet light gave the 787 g. (100% yield) of trichlorobenzyl bromide which was required as the starting material in the preparation of trichlorobenzoic acid.

A glass reactor was charged with 787 g. of trichlorobenzyl bromide and 393 g. of sodium formate along with 1820 g. of ethanol. This mixture was refluxed for eight hours, cooled and filtered. The resulting solution was distilled to remove alcohol. The remainder, 683 g. of trichlorobenzyl formate, was oxidized to the acid.

The 683 g. of trichlorobenzyl formate was treated with 3140 g. of 70% nitric acid and refluxed for eight hours. The mixture from the oxidation step was then cooled to 15° C. and the trichlorobenzoic acid was filtered off and washed with 1500 g. of water. After drying at 50° C. there was obtained 510 g. of the desired trichlorobenzoic acid. This constituted a yield of 78% based on the trichlorobenzyl bromide charged.

EXAMPLE IX

A mixture of 0.2 gram mole of trichlorobenzyl chloride, 0.2 mole of disodium oxalate, and 240 ml. of glacial acetic acid was refluxed for 8 hours. The charge was cooled, poured into 500 ml. of water, and extracted with three 100 ml. portions of benzene. The benzene was removed by distillation under partial vacuum. The residue, crude di-trichlorobenzyl oxalate, was oxidized to trichlorobenzoic acid with 2.4 moles of 70% nitric acid at reflux temperature for 8 hours. The product, trichlorobenzoic acid, was isolated in the manner described in Example V. Substantially the same yield was obtained as was described in Example V.

The same molar quantity of disodium malonate could be substituted for disodium oxalate in the above example.

EXAMPLE X

A mixture of 0.2 gram mole of trichlorobenzyl chloride, 0.6 mole of sodium glycollate, and 240 ml. of glacial acetic acid was refluxed for 8 hours. The charge was cooled, poured into 500 ml. of water, and extracted with three 100 ml. portions of benzene. The benzene was removed by distillation under partial vacuum. The residue, crude trichlorobenzyl glycollate was oxidized to trichlorobenzoic acid with 2.4 moles of 70% nitric acid at reflux temperature for 8 hours. The product, trichlorobenzoic acid, was isolated in the manner described in Example V. Substantially the same yield was obtained as was described in Example V.

Other hydroxy aliphatic acids such as lactic acid and citric acid may be used, although lower yields are obtained when citric acid is used.

EXAMPLE XI

A mixture of 0.2 gram mole of trichlorobenzyl chloride, 0.6 gram mole of sodium levulinate and 240 ml. of glacial acetic acid was refluxed for 8 hours. The crude ester was isolated and oxidized according to the procedure described in Example V. The yield of trichlorobenzoic acid based upon the trichlorobenzyl chloride charged was lower than the yields obtained by the nitric acid oxidation of the formate and acetate esters.

EXAMPLE XII

A mixture of 0.2 gram mole of trichlorobenzyl chloride, 0.6 gram mole of sodium benzoate and 240 ml. of glacial acetic acid was refluxed for 8 hours. The crude ester, trichlorobenzyl benzoate, was isolated and oxidized according to the procedure described in Example V. The yield of trichlorobenzoic acid based upon the trichlorobenzyl chloride charged was lower than the yields obtained by the nitric acid oxidation of the formate and acetate esters.

EXAMPLE XIII

A mixture of 300 g. of toluene and 16.3 grams of aluminum chloride was chlorinated at 15–20° C. until the weight increase of the charge was 322 g. The calculated increase for the addition of three gram atoms of chlorine is 336 grams. The charge was washed by shaking with four 1000 ml. portions of water. The washed chlorotoluene mixture was distilled under 20 mm. pressure absolute. A total of 537.5 g. of mixed di, tri and tetrachlorotoluene was recovered. The boiling range was 105–143° C./20 mm.

A 300 gram portion of the chlorotoluene mixture was converted to a mixture of the corresponding chlorobenzyl chlorides by chlorination at 205–210° C. A 100 gram portion of the chlorobenzyl chloride mixture was refluxed for 8 hours with 59.2 g. of sodium formate and 300 ml. of glacial acetic acid. The acetic acid was removed by distillation under reduced pressure. The crude ester was washed with 200 ml. of water, and then converted to a mixture of chlorobenzoic acids by refluxing with 470 g. of 70% nitric acid for 8 hours. The charge was cooled, poured into 400 ml. of water and extracted with 150 ml. of benzene. The benzene extract was washed with 100 ml. of water and then extracted with 300 ml. of 5% sodium hydroxide solution. The alkaline extract was poured into 100 ml. of 36% hydrochloric acid. The white precipitate of chlorobenzoic acids was filtered and dried at 55° C. in a vacuum oven. The product weighed 50 g.

EXAMPLE XIV

A mixture of 500 g. of o-chlorotoluene and 19.85 g. of aluminum chloride was chlorinated at 15–20° C. until the weight increase was 266 g. The calculated value for the addition of two gram atoms of chlorine is 273 g. The charge was washed with four 1000 ml. portions of water and then distilled under 20 mm. pressure. A total of 713.5 of mixed chlorotoluenes was recovered. The boiling range of the product was 87–135° C./20 mm. absolute.

A 300 g. portion of the mixture of chlorotoluenes was converted to a mixture of the corresponding benzyl chlorides by chlorination at 205–210° C. A 100 g. portion of the resulting mixture of chlorobenzyl chlorides was refluxed for 8 hours with 59.2 g. of sodium formate and 300 ml. of glacial acetic acid. The acetic acid was removed by distillation under reduced pressure. The crude ester was washed free of salts with 200 ml. of water. The crude ester was refluxed for 8 hours with 470 g. of 70% nitric acid, cooled, poured into 400 ml. of water and extracted with 450 ml. of benzene. The benzene extract was washed with 100 ml. of water and extracted with 300 ml. of 5% sodium hydroxide solution. The alkaline extract was poured into 100 ml. of 36% hydrochloric acid at 10–15° C. The white precipitate of trichlorobenzoic acid was filtered and dried at 55° C. in a vacuum oven. The product weighed 59.4 g.

EXAMPLE XV

One hundred and twenty grams (0.5 mole) of distilled trichlorobenzyl formate was refluxed for 8 hours with 6.0 moles of 70% nitric acid. The mixture was cooled to 15° C. The white crystalline trichlorobenzoic acid was separated by filtration, washed with 400 ml. of water and dried. The product weighed 104 g. (96% yield based on the trichlorobenzyl formate charged).

It will be observed from the foregoing examples that we prefer to distill the reaction mixture resulting from the chlorination of the starting material, such starting material usually being toluene or o-chlorotoluene, in order to obtain the trichlorobenzyl chloride which is subjected to esterification followed by oxidation. Such trichlorobenzyl chloride, while relatively pure as compared with an undistilled mixture, is normally a rather crude product nevertheless. While it is considered commercially impracticable to do so, the mixture mentioned may be very carefully distilled if desired, or otherwise treated to produce a virtually pure trichlorobenzyl chloride, or the reaction mixture resulting from the esterification may be distilled or otherwise treated to isolate a virtually pure ester for oxidation although this step is also considered to be commercially impracticable.

On the other hand, the undistilled reaction mixture resulting from the chlorination of the starting material may be esterified and then oxidized accordingly to the present invention. In this event, it will be appreciated that the mixture subjected to esterification and then to oxidization contained di, tri and tetra chlorobenzyl chloride as does the ordinary distilled trichlorobenzyl chloride to a lesser extent. Thus the di and tetra chlorobenzyl compounds may react while the reaction of the trichlorobenzyl compounds is going on and, of course, it is possible that products other than trichlorobenzyl esters contemplated by the present invention may be formed during the esterification or oxidization steps as a result of side reactions. Nevertheless, the yields of the desired trichlorobenzoic acid obtained by the present procedure are satisfactory and are considerably better than those obtained by known prior methods.

Accordingly, the trichlorobenzyl halide referred to herein and in the annexed claims, unless specified to the contrary, covers such halides whether they are in a pure or impure state, and in particular whether or not such halides are derived from a distilled reaction mixture or from a part of an undistilled mixture, although such reaction mixtures normally result from the chlorination of toluene or a chlorotoluene or mixtures thereof.

It will be understood that salts of the trichlorobenzoic acids, including those of the trichlorobenzoic acid isomer mixtures mentioned herein may be made in ways well known to a chemist skilled in this field. Such salts are, of course, useful in place of the acid and are also useful herbicides. The term "salts" includes the metal, ammonium and amine salts of trichlorobenzoic acid all of which are herbicides. In fact, some are more water soluble than the acid form and are just as good herbicides.

The process of the present invention is useful for the production of any of the trichlorobenzoic acids or of mixed isomers thereof. Since the process does not substantially change the relative proportion of the different isomers of the trichlorobenzoic halide used, the proportion of the different isomers in the mixed isomer product is dependent almost entirely on the composition of the halide, which in turn is dependent on the composition of the trichlorotoluene when the trichlorobenzyl halide is prepared from the trichlorotoluene, as is preferred. The end product, whether regarded as a relatively pure form of 2,3,6 trichlorobenzoic acid when that isomer is quantitatively predominant, or whether regarded as a mixture of isomers, is useful for any of the purposes for which this acid is useful.

A special utility has been found to reside in the product referred to hereinbefore as the mixture of isomers of trichlorobenzoic acid. This resides in its utility as a herbicide. The product demonstrates a high degree of herbicidal activity generally comparable with and in some uses superior to that of 2,4 dichlor-phenoxy acetic acid, commonly known as "2–4–D." In particular, it has been found useful in the process of weed control invented by Nathaniel Tischler, which is the subject of the copending application Serial Number 463,829 filed October 21, 1954, now abandoned.

The Tischler process involves the application to the soil of 2,3,6-trichlorobenzoic acid or its salts thereof in order to protect certain crops defined in the aforementioned application such as corn or sugar cane against weed growth subsequent to preparation of the soil for planting. In one way of carrying out this process, it appears that the so-called mixed isomer product of the process described above, although containing only about 70% or so of the 2,3,6 isomer, gives results apparently equivalent to those of the pure 2,3,6 isomer. The other isomers present, of which the 2,4,5 isomer is the major one, do not individually have herbicidal activity at all comparable with that of the 2,3,6 isomer. Consequently, one would have supposed that a total content of such other isomers of the order of 30% would have a diluent effect requiring the use of an increased dosage to give results comparable to those of the 2,3,6 isomer alone. Nevertheless this mixture of isomers has been tested on a pound for pound basis with "2–4–D" and found to be practically as effective as pure 2,3,6 trichlorobenzoic acid when the latter is tested under like conditions.

We have no explanation of the apparent equivalence between the mixed isomer product and the pure 2,3,6 isomer and are forced to an entirely empirical view of this mixed isomer product as a herbicide. The high content of the 2,3,6 isomer is undoubtedly responsible in a major way for its effects, but the action of the other components is not known, and the mixed isomers of trichlorobenzoic acid do produce an unexpected and unaccountable effect, synergistic effect. Also, the analyses reported above is based on the assumption that the product analyzed is composed wholly of isomers of trichlorobenzoic acids, which is certainly almost wholly true but does not exclude the possible presence of terrace amounts of other compounds of unknown composition.

For particular examples of the utility of this mixture in the Tischler process, where the effects are markedly superior to those of an equal weight of "2–4–D," reference is made to the Tischler application identified above. The mixture is also useful when applied as a herbicide to the foliage of growing plants. As an article of manufacture, the novel mixture therefore has utility as a herbicide without limitation to the Tischler process.

A highly desirable mixture for herbicidal use is one which, in terms of isomer composition as determined by analysis, has about 70% of 2,3,6-trichlorobenzoic acid, in which event it may contain about 20% of 2,4,5-trichlorobenzoic acid, with other isomers being present. Useful products exist also however in mixtures of isomers containing a major amount, at least 50% of the 2,3,6-isomer although the preferred mixtures contain at least 60% of the 2,3,6-isomer. The 2,3,6-isomer may, of course, be present in higher percentages and the mixed trichlorobenzoic isomers containing in the range of about 60% to 75% of the 2,3,6 isomer are very effective herbicides. Within substantially these same ranges, equivalent quantities of the product may exist also in the form of the trichlorobenzoic acid salts which are useful herbicides. The salts of the mixed isomers as well as the mixed acid isomers containing at least 50%, and preferably at least 60%, of 2,3,6-isomer have an unexpectedly high herbicidal effect.

We claim:

1. In a method of producing trichlorobenzoic acid, the steps comprising esterifying a trichlorobenzyl halide selected from the group consisting of trichlorobenzyl chloride and trichlorobenzyl bromide with an alkali metal salt of a saturated, monocarboxylic aliphatic acid containing from 1 to 5 carbon atoms to form a reaction mixture containing the trichlorobenzyl ester of said acid having the following structural formula.

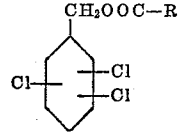

where R is selected from the group consisting of H, $CH_3$, $C_2H_5$, $C_3H_4$ and $C_4H_5$, and then oxidizing said trichlorobenzyl ester to trichlorobenzoic acid.

2. In a method of producing trichlorobenzoic acid, the steps comprising esterifying trichlorobenzyl chloride with sodium formate to form trichlorobenzyl formate, and oxidizing the trichlorobenzyl formate to form trichlorobenzoic acid.

3. In a method of producing trichlorobenzoic acid, the steps comprising esterifying trichlorobenzyl chloride with sodium formate to form trichlorobenzyl formate, and oxidizing the trichlorobenzyl formate with nitric acid to form trichlorobenzoic acid.

4. In a method of producing trichlorobenzoic acid, the steps comprising esterifying trichlorobenzyl chloride with sodium acetate to form trichlorobenzyl trichlorobenzyl acetate, and oxidizing the trichlorobenzyl acetate to form trichlorobenzoic acid.

5. In a method of producing trichlorobenzoic acid, the steps comprising esterifying trichlorobenzyl chloride with sodium acetate to form trichlorobenzyl acetate, and oxidizing the trichlorobenzyl acetate with nitric acid to form trichlorobenzoic acid.

6. The method of producing a mixture of isomers of trichlorobenzoic acid containing 2,3,6-trichlorobenzoic acid comprising the steps of esterifying a mixture of isomers of trichlorobenzyl chloride with sodium acetate to form a mixture of isomers of trichlorobenzyl acetate, and oxidizing the mixed isomers of trichlorobenzyl acetate with nitric acid to form a mixture of isomers of trichlorobenzoic acid, each of said mixtures of isomers containing at least 60% by weight of the respective 2,3,6-isomer.

7. The method of producing a mixture of isomers of trichlorobenzoic acid containing 2,3,6-trichlorobenzoic acid comprising the steps of esterifying a mixture of isomers of trichlorobenzyl chloride with sodium formate to form a mixture of isomers of trichlorobenzyl formate, and oxidizing the mixed isomers of trichlorobenzyl formate with nitric acid to form a mixture of isomers of trichlorobenzoic acid, each of said mixtures of isomers containing at least 60% by weight of the respective 2,3,6-isomer.

8. The method of producing a mixture of isomers of trichlorobenzoic acid containing 2,3,6-trichlorobenzoic acid comprising the steps of esterifying a mixture of trichlorobenzyl chloride isomers with an alkali metal salt of an acid selected from the group consisting of formic acid and acetic acid in the presence of glacial acetic acid to form a mixture of isomers of the ester of trichlorobenzyl alcohol and said acid, and thereafter oxidizing the said mixed isomers of the ester with nitric acid to form a mixture of isomers of trichlorobenzoic acid.

9. The method of producing trichlorobenzoic acid, which comprises nuclear chlorinating a compound selected from the group consisting of toluene, o-chlorotoluene, m-chlorotoluene, dichlorotoluene, and mixtures thereof in the presence of a catalyst to produce trichlorotoluene, heating said trichlorotoluene with a halogen compound selected from the group consisting of bromine and chlorine to form trichlorobenzyl halide, heating said halide with an alkali metal salt of a saturated, mono- carboxylic aliphatic acid containing from 1 to 5 carbon atoms to produce the trichlorobenzyl ester of said acid and oxidizing said ester to the corresponding trichlorobenzoic acid.

10. The method of producing a mixture of isomers of trichlorobenzoic acid containing 2,3,6-trichlorobenzoic acid comprising the steps of chlorinating o-chlorotoluene with about 2 moles of chlorine per mole of o-chlorotoluene in the presence of a catalyst selected from the group consisting of aluminum chloride, antimony chloride, boron trifluride, iron, and zirconium chloride to form a mixture of chlorotoluenes, distilling the mixed chlorotoluenes and separating the fraction consisting mainly of mixed isomers of trichlorotoluene, heating and reacting the mixed isomers of trichlorotoluene with 1 mole of chlorine per mole of trichlorotoluene to form a mixture of isomers of trichlorobenzyl chloride, esterifying the trichlorobenzyl chloride isomers with sodium formate to form a mixture of isomers of trichlorobenzyl formate, and oxidizing the trichlorobenzyl formate to form a mixture of isomers of trichlorobenzoic acid including 2,3,6-trichlorobenzoic acid.

References Cited in the file of this patent

UNITED STATES PATENTS 2,666,786   Kulka et al.   Jan. 19, 1954

FOREIGN PATENTS 698,734   Great Britain   Oct. 21, 1953

OTHER REFERENCES

Beilstein et al.: Annalen, 146, pages 325–6 (1868).
Beilstein et al.: Annalen, 150, pages 286–9 (1869).
Brimelow et al.: Chem. Absts., 46, pages 2002–3 (1952).
Wagner et al.: Synthetic Organic Chemistry, pages 98 and 484 (1953).